A. O. CARPENTER.
COMPRESSOR UNLOADER.
APPLICATION FILED JAN. 6, 1921.

1,395,090.

Patented Oct. 25, 1921.

INVENTOR
Allan O. Carpenter
BY
Herbert L. Ogden
his ATTORNEY

UNITED STATES PATENT OFFICE.

ALLAN O. CARPENTER, OF CORNING, NEW YORK, ASSIGNOR TO INGERSOLL-RAND COMPANY, OF JERSEY CITY, NEW JERSEY, A CORPORATION OF NEW JERSEY.

COMPRESSOR-UNLOADER.

1,395,090.

Specification of Letters Patent.  Patented Oct. 25, 1921.

Application filed January 6, 1921. Serial No. 435,478.

*To all whom it may concern:*

Be it known that I, ALLAN O. CARPENTER, a citizen of the United States, and a resident of Corning, county of Steuben, State of New York, have invented a certain Compressor-Unloader, of which the following is a specification accompanied by drawings.

This invention relates to unloading devices for compressors, but more particularly to a starting unloader for electrically driven compressors, although the device also operates as a start and stop pressure control for the compressor in the preferred form of the invention illustrated, and to be described.

The primary objects of the invention are to enable the compressor to start without load and to automatically resume load when normal operating speed has been attained, and furthermore, to protect the apparatus in case of failure of voltage, since in accordance with this invention, unloading will automatically take place as soon as the current fails and will not be resumed when current is restored until the compressor has attained sufficient speed to permit the load to be resumed safely.

These and other objects, which will appear, are carried out by simple and efficient devices shown in one of their preferred forms in the accompanying drawings, in which—

Figure 1:
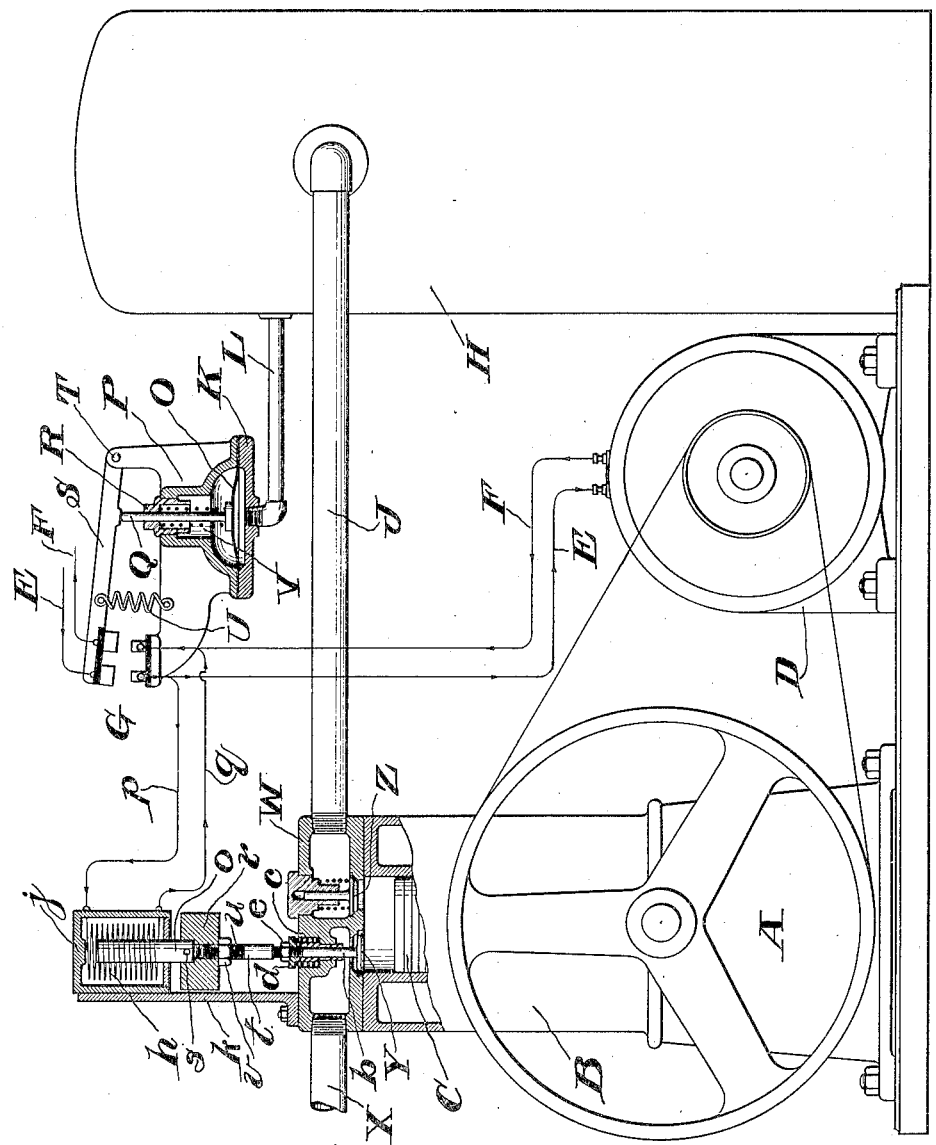
Figure 2:
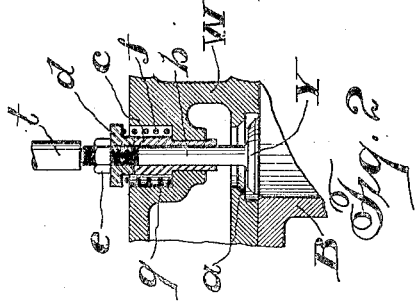

Figure 1 is a side elevation partly in vertical section of an electrically driven compressor unit provided with my improved unloader, and Fig. 2 is an enlarged detail vertical sectional view of a portion of the cylinder head and an inlet valve.

Referring to the drawings, the compressor A in this instance a vertical compressor, having the cylinder B and piston C is driven by the electric motor D connected to the supply circuit E F from any suitable source through the controlling switch G. The compressor is connected to the usual receiver tank H by the pipe J and a suitable pressure regulator, in this instance a diaphragm regulator, is preferably connected to the upper portion of the tank H by the pipe L and arranged to control the electric switch G.

As shown in this instance, the pressure regulator is of the diaphragm type for illustrative purposes, and contains the diaphragm O within the casing P which diaphragm is provided with the stem Q extending through the sleeve R and bearing against the switch arm S pivoted at T to the casing P and provided with the retracting spring U. A compression spring V is preferably arranged between the sleeve R and the head of the stem Q on the diaphragm. The switch G is shown in open position, breaking the supply circuit E F to the motor D. When the desired maximum pressure in the receiver tank H is reached, being that for which the pressure regulator has been adjusted, the regulator operates, stopping the motor. When the pressure falls again, the motor is automatically started in an obvious manner. I am not to be understood however, as limiting the invention to a regulator of the type shown and described.

The compressor cylinder B is provided with the head W to which the inlet pipe X and the discharge pipe J are connected. The head is also provided with an inlet valve Y and discharge valve Z of any suitable construction, in this instance valves of the puppet type being shown. The inlet valve Y is shown in detail in Fig. 2 in open position and adapted to be seated on the valve seat $a$. The valve stem $b$ extends through a sleeve $c$ and in this instance is provided with a collar $d$ held in position by a nut $e$. A valve spring $f$ is arranged between the collar $d$ and the casing W within the recess $g$.

An electro-responsive device shown in this instance as a solenoid $h$ within the casing $j$, is suitably supported by means of the bracket $k$ adjacent the inlet valve Y and preferably for convenience in a position over said valve. The electro-responsive device is provided with a movable member, in this instance in the form of a core $o$ adapted to be actuated by the energizing and deënergizing of the solenoid. The solenoid circuit $p$ and $q$ is shown connected to the motor supply circuit E F at such points adjacent the controlling switch G that the solenoid circuit is made and broken in accordance with the starting and stopping of the motor.

The solenoid core *o* is weighted in this instance by means of the weight *r* connected to the core by means of the pin *s* and a stud *t* is adjustably connected to the weight *r* as by means of the screw threaded portion *u* and nut *v*. When the solenoid *h* is deënergized, the stud *t* rests upon the top of the valve stem *b* so that the weight of the parts including the weight *r* maintains the inlet valve Y open, and this is the condition on starting the compressor. There may be more than one inlet valve Y although one is shown for illustrative purposes and as long as the inlet valves of a compressor are open, the piston as well understood, works against atmospheric pressure only, and pressure can not be built up in the receiver. One of the objects of the unloader is to keep the inlet valve or valves open until the compressor motor has attained the normal operating speed, thus keeping the compressor unloaded during the starting period. In accordance with my invention, the weight *r* is so chosen and the stud *t* is so adjusted, that the solenoid *h* will not quite lift the weight and connecting parts if the solenoid is energized while the compressor is at rest. Under working conditions the solenoid automatically becomes energized when the switch G is closed and the motor is started. By the time the compressor has been accelerated to approximately its normal operating speed, the action of the air in the compressor cylinder B imparts sufficient lifting impulse to the inlet valve to assist in raising the weight and enable the solenoid to retract the core and pick up the weight, thus releasing the inlet valve allowing the compressor to build up pressure to the desired maximum.

The solenoid *h* is not strong enough to lift the weight and permit the inlet valve to close the instant that the switch G closes and energize the solenoid. The stud *t* is made adjustable in the weight and locked by the lock nut *v* in order to determine the length of the core *o* in the solenoid coil *h*. As the compressor runs, the air passes through the restricted opening of the inlet valve Y, which is fully open, helps to lift the valve and enables the solenoid to lift the weight *r* and permit the valve to function.

The unloader also acts as a start and stop pressure controller, because when the pressure in the receiver tank H is sufficient the switch G is automatically opened, deënergizing the solenoid *h* and opening the inlet valve or valves. Another feature of the unloader resides in the protection afforded in case of failure of voltage, since unloading will automatically occur as soon as current fails and the solenoid is deënergized. When current is restored, the weight *r* will not be picked up until sufficient speed has been attained to permit the load to be safely resumed. The conditions are then substantially identical with those described on starting.

I claim:

1. In a compressor, the combination with a cylinder and an inlet valve, of an electro-responsive device having a movable member operatively arranged to control said valve, the said electro-responsive device when energized having insufficient strength to move said member and permit the valve to close until the compressor is at a predetermined speed, whereby the pressure in the compressor cylinder assists the valve to close and enables the electro-responsive device to retract and hold the said movable member away from the valve.

2. In a compressor, the combination with a cylinder and spring pressed inlet valve, of a solenoid controlling said valve, a core for the solenoid operatively arranged to maintain said valve open when the solenoid is deënergized, the solenoid being of insufficient strength, when energized to retract the core until the compressor is at normal operating speed whereby the pressure in the compressor cylinder assists the valve to close and enables the solenoid to retract and hold the core so that the inlet valve may close.

3. In a compressor, the combination with a cylinder and spring pressed inlet valve of the puppet type, of a solenoid mounted over the valve, a solenoid core carrying a weight, an adjustable stud extending downwardly from said weight and adapted to bear upon the stem of the inlet valve, the solenoid being of insufficient strength when energized to lift the core and weight until the compressor has been accelerated to approximately its normal operating speed, whereby the pressure of the fluid in the compressor cylinder gives sufficient lifting impulse to the inlet valve to enable the solenoid to pick up and hold the core and weight and permit the valve to close.

4. In an electrically driven compressor the combination with a cylinder and spring pressed inlet valve, of an electric motor for driving the compressor, a receiver tank, a pressure regulator, an electric switch controlled by said pressure regulator, an electro-responsive device controlled by said switch and having a movable member controlling said inlet valve, said electro-responsive device being adapted to maintain said valve open until the compressor has reached a predetermined speed, and then acting to retract the said movable valve controlling member and permit the valve to close.

5. In an electrically driven compressor the combination with a cylinder and a spring pressed inlet valve, of an electric motor for driving the compressor, a receiver tank, a pressure regulator, an electric switch controlled by said pressure regulator, an electro-responsive device controlled by said switch and having a movable member controlling said inlet valve, said electro-responsive device being adapted to maintain said valve open until the compressor has reached a predetermined speed, but being incapable when energized of actuating said movable member to release the valve until the pressure in the cylinder has imparted a given impulse and lift to the valve.

In testimony whereof I have signed this specification.

ALLAN O. CARPENTER.